US010824943B2

(12) United States Patent
Tong et al.

(10) Patent No.: US 10,824,943 B2
(45) Date of Patent: Nov. 3, 2020

(54) HIGH PRECISION LOW BIT CONVOLUTIONAL NEURAL NETWORK

(71) Applicant: GM GLOBAL TECHNOLOGY OPERATIONS LLC, Detroit, MI (US)

(72) Inventors: Wei Tong, Troy, MI (US); Shuqing Zeng, Sterling Heights, MI (US); Upali P. Mudalige, Oakland Township, MI (US); Shige Wang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 16/107,315

(22) Filed: Aug. 21, 2018

(65) Prior Publication Data
US 2020/0065661 A1 Feb. 27, 2020

(51) Int. Cl.
*G06K 9/00* (2006.01)
*G06K 9/62* (2006.01)
*G06N 3/08* (2006.01)
*G06N 3/04* (2006.01)
*G06K 9/38* (2006.01)

(52) U.S. Cl.
CPC ........... *G06N 3/08* (2013.01); *G06K 9/00791* (2013.01); *G06K 9/38* (2013.01); *G06N 3/04* (2013.01); *G06K 9/6262* (2013.01)

(58) Field of Classification Search
None
See application file for complete search history.

(56) References Cited

U.S. PATENT DOCUMENTS

2017/0270408 A1* 9/2017 Shi .......................... G06N 3/04

OTHER PUBLICATIONS

Jiao et al. "Accelerating low bit-width convolutional neural networks with embedded FPGA", 2017 27th International Conference on Field Programmable Logic and Applications (FPL) (Year: 2017).*
Cai et al. "Training low bitwidth convolutional neural network on RRAM", 2018 23rd Asia and South Pacific Design Automation Conference (ASP-DAC) (Year: 2018).*
Colangelo et al. "Exploration of Low Numeric Precision Deep Learning Inference Using Intel® FPGAs", arXiv, 2018 (Year: 2018).*

(Continued)

*Primary Examiner* — Randolph I Chu
(74) *Attorney, Agent, or Firm* — Cantor Colburn LLP

(57) ABSTRACT

Described herein are systems, methods, and computer-readable media for generating and training a high precision low bit convolutional neural network (CNN). A filter of each convolutional layer of the CNN is approximated using one or more binary filters and a real-valued activation function is approximated using a linear combination of binary activations. More specifically, a non-1×1 filter (e.g., a k×k filter, where k>1) is approximated using a scaled binary filter and a 1×1 filter is approximated using a linear combination of binary filters. Thus, a different strategy is employed for approximating different weights (e.g., 1×1 filter vs. a non-1×1 filter). In this manner, convolutions performed in convolutional layer(s) of the high precision low bit CNN become binary convolutions that yield a lower computational cost while still maintaining a high performance (e.g., a high accuracy).

20 Claims, 6 Drawing Sheets

(56) References Cited

OTHER PUBLICATIONS

Zhou et al. "Incremental Network Quantization: Towards Lossless CNNS With Low-Precision Weights", ICLR 2017, arXiv:1702.03044v2 [cs.CV] Aug. 25, 2017 (Year: 2017).*
Wang et al. "Two-Step Quantization for Low-bit Neural Networks", CVPR, Jun. 9, 2018 (Year: 2018).*

* cited by examiner

HIGH PRECISION LOW BIT CONVOLUTIONAL NEURAL NETWORK

INTRODUCTION

Machine learning involves the generation and use of algorithms capable of learning from and making predictions on data. Such algorithms typically operate by building a model from example inputs in order to make data-driven predictions or decisions. A number of machine learning approaches have been developed. One such approach, known as an artificial neural network (ANN), or simply a neural network (NN), is a learning algorithm inspired by the structure and function of biological neural networks.

An NN includes hierarchal layers of interconnected groups of artificial neurons (nodes), where each layer of nodes receives as inputs the outputs of a lower layer. Deep neural networks (DNNs) are a type of NN that includes one or more hidden layers of nodes. Feed-forward NNs are NNs in which connections between the nodes do not form a cycle. That is, feed-forward NNs are NNs in which the information moves in only one direction, forward, from the input nodes, through the nodes of one or more hidden layers (if any), and ultimately to the output nodes. Convolutional NNs constitute a class of deep, feed-forward NNs that include input and output layers as well as multiple hidden layers. The hidden layers typically include convolutional layers, pooling layers, fully-connected layers, and normalization layers. Technical improvements to conventional CNNs, particularly with respect to performing high precision multiplication and accumulation operations, are described herein.

SUMMARY

In one or more example embodiments of the disclosure, a method for training a high precision low bit convolutional neural network (CNN) is disclosed. The method includes receiving input to a convolutional layer of the CNN, where the convolutional layer includes a 1×1 filter. The method further includes approximating a real-valued activation function using a linear combination of binary activations and processing the input using each binary activation to obtain a set of binary activation results. The method additionally includes approximating the 1×1 filter using a linear combination of binary filters, convolving each binary activation result with the linear combination of binary filters to obtain a set of convolved results, and summing the convolved results to obtain an output of the convolutional layer.

In one or more example embodiments, the input is a first input, the convolutional layer is a first convolutional layer, the set of binary activation results is a first set of binary activation results, and the set of convolved results is a first set of convolved results, and the method further includes receiving second input to a second convolutional layer of the CNN, where the second convolutional layer includes a non-1×1 filter, and processing the second input using each binary activation to obtain a second set of binary activation results. The method additionally includes approximating the non-1×1 filter using a scaled binary filter, convolving each binary activation result in the second set of binary activation results with the scaled binary filter to obtain a second set of convolved results, and summing the convolved results in the second set of convolved results to obtain an output of the second convolutional layer.

In one or more other example embodiments of the disclosure, a system for training a high precision low bit convolutional neural network (CNN) is disclosed. The system includes at least one memory storing computer-executable instructions and at least one processor configured to access the at least one memory and execute the computer-executable instructions to perform a set of operations. The operations include receiving input to a convolutional layer of the CNN, where the convolutional layer includes a 1×1 filter. The operations further include approximating a real-valued activation function using a linear combination of binary activations and processing the input using each binary activation to obtain a set of binary activation results. The operations additionally include approximating the 1×1 filter using a linear combination of binary filters, convolving each binary activation result with the linear combination of binary filters to obtain a set of convolved results, and summing the convolved results to obtain an output of the convolutional layer.

In one or more example embodiments, the input is a first input, the convolutional layer is a first convolutional layer, the set of binary activation results is a first set of binary activation results, and the set of convolved results is a first set of convolved results, and the at least one processor is further configured to execute the computer-executable instructions to perform additional operations including receiving second input to a second convolutional layer of the CNN, where the second convolutional layer includes a non-1×1 filter, and processing the second input using each binary activation to obtain a second set of binary activation results. The additional operations further include approximating the non-1×1 filter using a scaled binary filter, convolving each binary activation result in the second set of binary activation results with the scaled binary filter to obtain a second set of convolved results, and summing the convolved results in the second set of convolved results to obtain an output of the second convolutional layer.

In one or more other example embodiments of the disclosure, a computer program product for training a high precision low bit convolutional neural network (CNN) is disclosed. The computer program product includes a non-transitory storage medium readable by a processing circuit, the storage medium storing instructions executable by the processing circuit to cause a method to be performed. The method includes receiving input to a convolutional layer of the CNN, where the convolutional layer includes a 1×1 filter. The method further includes approximating a real-valued activation function using a linear combination of binary activations and processing the input using each binary activation to obtain a set of binary activation results. The method additionally includes approximating the 1×1 filter using a linear combination of binary filters for each channel of the input, convolving each binary activation result with the linear combination of binary filters to obtain a set of convolved results, and summing the convolved results to obtain an output of the convolutional layer.

In one or more example embodiments, the input is a first input, the convolutional layer is a first convolutional layer, the set of binary activation results is a first set of binary activation results, and the set of convolved results is a first set of convolved results, and the method performed by the processing circuit executing the stored instructions further includes receiving second input to a second convolutional layer of the CNN, where the second convolutional layer includes a non-1×1 filter, and processing the second input using each binary activation to obtain a second set of binary activation results. The additional operations further include approximating the non-1×1 filter using a scaled binary filter, convolving each binary activation result in the second set of binary activation results with the scaled binary filter to obtain a second set of convolved results, and summing the convolved results in the second set of convolved results to obtain an output of the second convolutional layer.

In accordance with one or more example embodiments, the non-1×1 filter of the convolutional layer is approximated by solving an optimization problem to determine a scalar value and a corresponding binary filter of the scaled binary filter.

In accordance with one or more example embodiments, the 1×1 filter of the convolutional layer is approximated by solving an optimization problem to determine a set of scalar values and a set of corresponding binary filters of the linear combination of binary filters.

In accordance with one or more example embodiments, backpropagation is performed to adjust weights of the scaled binary filter and weights of the linear combination of binary filters and backpropagation is further performed to adjust one or more binary activations of the linear combination of binary activations.

In accordance with one or more example embodiments, the real-valued activation function is approximated using the linear combination of binary activations by applying a binarization function to the real-valued activation function using, at least in part, an indicator function that produces a binary output.

In accordance with one or more example embodiments, the input includes an image of a surrounding environment of a vehicle and the trained high precision low bit CNN is implemented on an embedded device operatively coupled to the vehicle. In accordance with one or more example embodiments, the high precision low bit CNN is applied to the image to perform object recognition and a notification of the results of the object recognition is presented on a display operatively coupled to the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
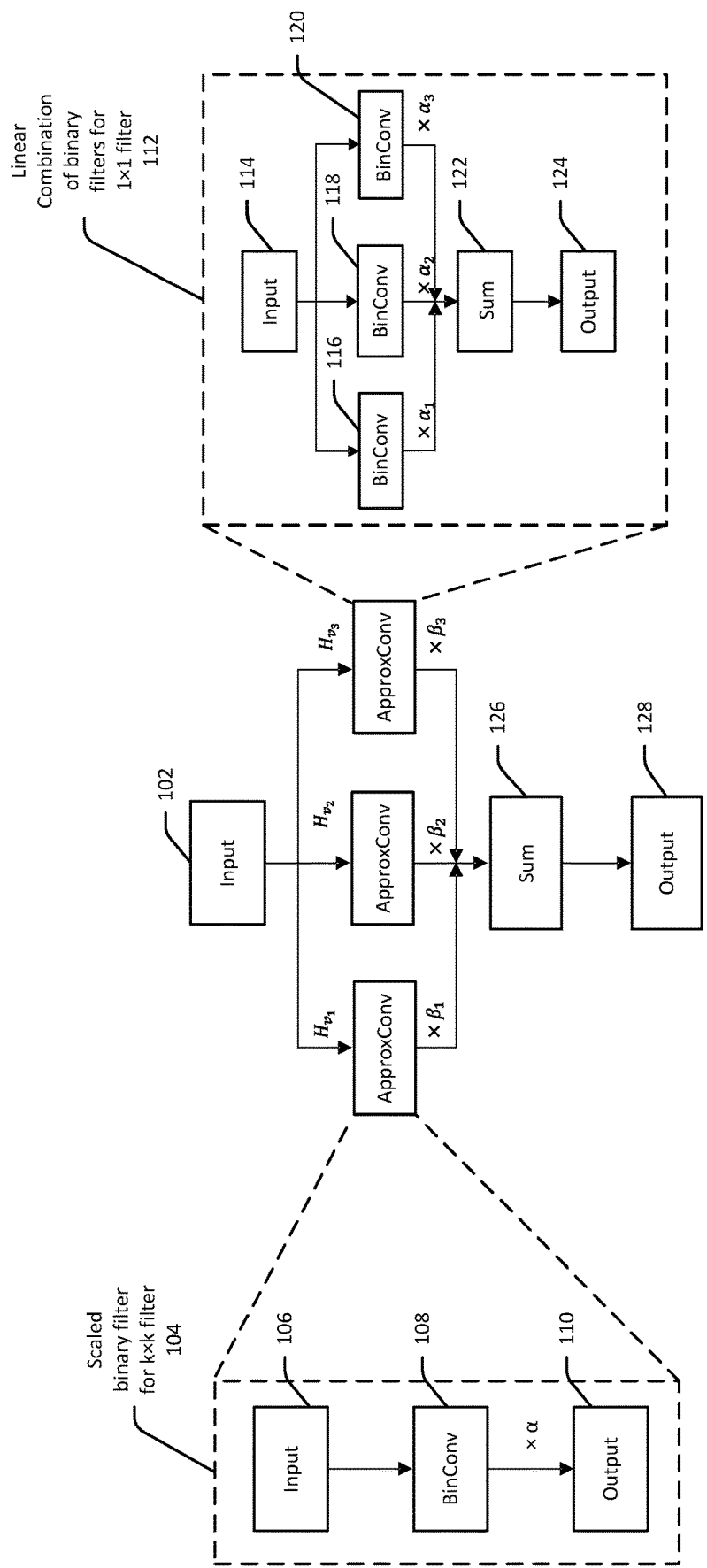
FIG. 1 schematically depicts an approximation of a k×k filter using a scaled binary filter and an approximation of a 1×1 filter using a linear combination of binary filters within a high precision low bit convolutional neural network (CNN) in accordance with one or more example embodiments of the disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), a Field Programmable Gate Array (FPGA), an electronic circuit, a processor (shared, dedicated, or group) and memory that executes one or more software or firmware programs, a combinational logic circuit, and/or other suitable components that provide the described functionality.

Disclosed herein are systems, methods, and computer-readable media for generating and training a high precision low bit convolutional neural network (CNN). In example embodiments, filters of convolutional layers of the CNN are approximated using binary filters and a real-valued activation function is approximated using a linear combination of binary activations. More specifically, in accordance with example embodiments, a non-1×1 filter (e.g., a k×k filter where k>1) is approximated using a scaled binary filter and a 1×1 filter is approximated using a linear combination of binary filters. Thus, in accordance with example embodiments, a different strategy is employed for approximating different weights (e.g., 1×1 filter vs. a non-1×1 filter). In this manner, convolutions performed in convolutional layers of the high precision low bit CNN according to example embodiments become binary convolutions that yield a lower computational cost while still maintaining a high performance (e.g., a high classification accuracy). As used herein, a k×k filter is assumed to have a value of k>1, and the term k×k filter may be used interchangeably with the term non-1×1 filter.

Conventional approaches for decreasing the computational cost associated with CNNs include, for example, reducing the precision of the data representation within the CNN (e.g., reducing the number of bits used to represent data within the CNN). This approach, however, results in a significant performance drop, that is, a significant loss in accuracy. Example embodiments provide an improvement to conventional approaches for decreasing the computational cost of CNNs by providing a high precision low bit CNN that has lower computational costs than conventional CNNs but that does not result in the significant performance drop associated with the conventional approaches for reducing the computational cost.

In particular, in accordance with example embodiments, the different strategies employed for approximating different weights (e.g., use of a scaled binary filter to approximate a non-1×1 filter and use of linear combination of binary filters to approximate a 1×1 filter) lower the computational costs of the high precision low bit CNN, while the use of linear combinations of multiple binary weights and activations maintains a desired accuracy/performance of the CNN. The lower computational cost achieved by a high precision low bit CNN in accordance with example embodiments while maintaining high performance (e.g., a desired accuracy)

associated with higher bit CNNs constitutes a technical effect and benefit over conventional CNN implementations.

In addition, high precision low bit CNNs in accordance with example embodiments provide an additional technical benefit over conventional CNNs because CNNs in accordance with example embodiments can be implemented on more low-cost and high-speed devices such as FPGAs, whereas implementing conventional CNNs on such devices would be computationally infeasible. In particular, convolution operations performed in a convolutional layer of a CNN include multiplication and accumulation (MAC) operations. Typically, many thousands or millions of such MAC operations are performed in a given convolutional layer depending on the number of filters used. Typical FPGAs only include a few thousand digital signal processors (DSPs) capable of performing the computationally intensive MAC operations. Example embodiments convert these MAC operations into a series of binary operations, and as a result, allow for a high precision low bit CNN in accordance with example embodiments to be implemented on one or more FPGAs, each of which can include a million or more computational units for performing such binary operations. As a result, a high precision low bit CNN in accordance with example embodiments provides a technical effect and benefit over conventional CNNs by enabling implementation on low-cost and high-speed devices such as FPGAs.

Further, in conventional CNN implementations, the intermediate data generated from the large number of MAC operations performed at a given convolutional layer is large and the computational resources available for performing such operations is limited. As a result, intermediate data must often be saved to external memory because on-board memory may not be sufficient. This is particularly the case for devices such as FPGAs that have both a very limited number of computational units (e.g., DSPs) capable of performing MAC operations as well as a very limited amount of on-board memory. However, when implemented on a FPGA or a set of FPGAs, a high precision low bit CNN in accordance with example embodiments significantly reduces the data movement between computational units and external memory. This is achieved by converting the MAC operations to binary operations. As noted earlier, FPGAs include a large number of computational units for handling binary operations, and thus, intermediate data produced at a given convolutional layer can be pipelined to a next convolutional layer without requiring (or at least reducing) storage of the intermediate data in an external memory. This constitutes yet another technical effect and benefit over conventional CNN implementations.

The above-described technical effects and benefits of example embodiments constitute an improvement to computer technology. Specifically, such technical effects and benefits constitute an improvement to computer-based CNN technology.

Figure 4:
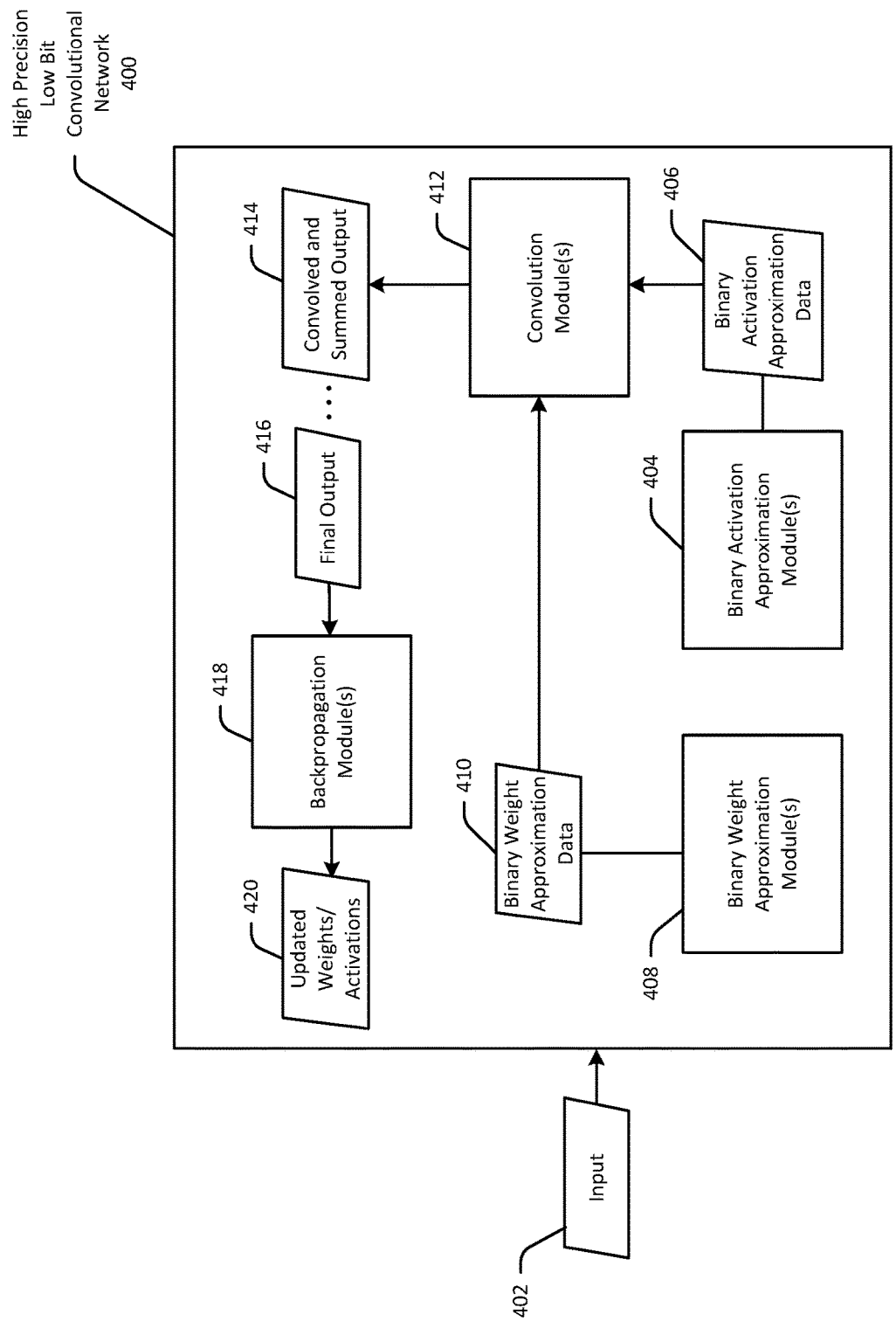
FIG. 4 is a hybrid schematic block/data flow diagram illustrating a high precision low bit CNN in accordance with one or more example embodiments.
Figure 5:
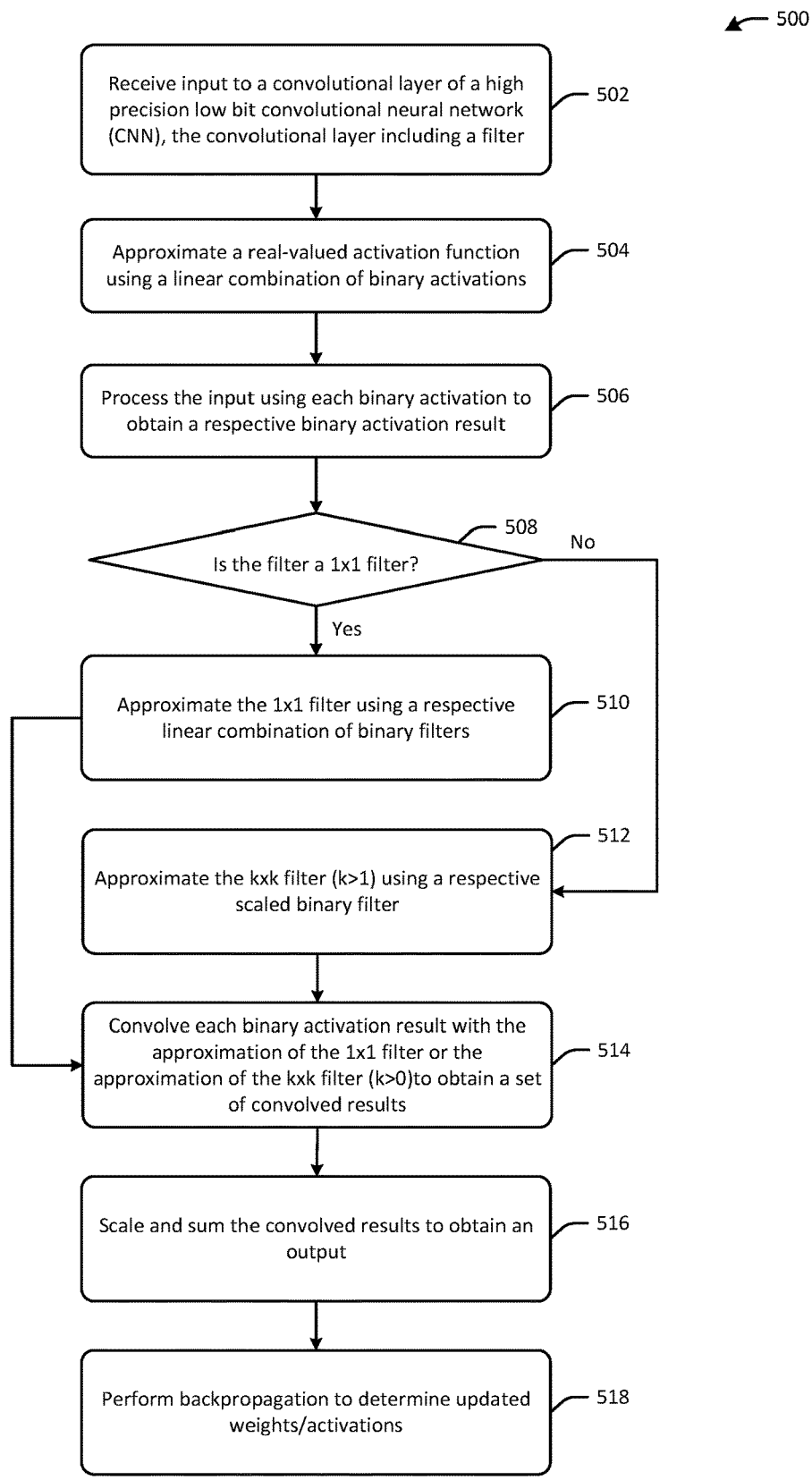
FIG. 5 is a process flow diagram of an illustrative method of operation of a high precision low bit CNN in accordance with one or more example embodiments of the disclosure.

FIG. 1 schematically depicts an approximation of a k×k filter using a scaled binary filter and an approximation of a 1×1 filter using a linear combination of binary filters within a high precision low bit convolutional neural network (CNN) in accordance with one or more example embodiments of the disclosure. FIG. 4 is a hybrid schematic block/data flow diagram illustrating a high precision low bit CNN in accordance with one or more example embodiments. FIG. 5 is a process flow diagram of an illustrative method 500 of operation of a high precision low bit CNN in accordance with one or more example embodiments of the disclosure. FIGS. 1, 4, and 5 will be described in conjunction with one another hereinafter.

While FIG. 1 shows an approximation of a k×k filter using a scaled binary filter and an approximation of a 1×1 filter using a linear combination of binary filters, it should be appreciated that for a given activation function and a given filter (1×1 or k×k), only one activation strategy is used in example embodiments. That is, in example embodiments, if the original filter is a k×k filter, then all paths of the input are approximated using a scaled binary filter (where each path of the input corresponds to a respective binary activation of a linear combination of binary activations used to approximate the activation function), and if the original filter is a 1×1 filter, then all paths of the input are approximated using a linear combination of binary filters. In addition, the illustrative method 500 of FIG. 5 is described using a single convolutional layer and a single filter as an example. It should be appreciated, however, that one or more operations of the method 500 may be performed with respect to any number of convolutional layers and with respect to any number of filters in a given convolutional layer.

Referring now to FIGS. 1, 4, and 5 together, at block 502 of the method 500, in accordance with example embodiments, an input 402 is received by a high precision low bit CNN 400. In example embodiments, the input 402 may be a specific input 102 (shown in FIG. 1) received at a particular convolutional layer of the CNN 400. The input 102 may be an output of a lower layer of the CNN 400 or an initial input to an initial convolutional layer of the CNN 400. Example embodiments of the invention will be described hereinafter in reference to the specific input 102 to a particular convolutional layer.

At block 504 of the method 500, in accordance with example embodiments, computer-executable instructions of one or more binary activation approximation module(s) 404 are executed to approximate a real-valued activation function using a linear combination of binary activations. An approximation of a real-valued high precision activation function using three binary activations $H_{v1}$, $H_{v2}$, and $H_{v3}$ is illustratively depicted in FIG. 1. In example embodiments, each binary activation corresponds to a particular path for processing the input 102. More specifically, the binary activations $H_{v1}$, $H_{v2}$, and $H_{v3}$ correspond to the paths 130, 132, and 134, respectively. It should be appreciated that three binary activations are depicted solely by way of example and that any number of binary activations may be used to approximate a real-valued activation function. In example embodiments, the real-valued activation function may be a rectifier given by, for an input x, $f(x)=\max(0, x)$. A unit employing the rectifier may be a rectified linear unit (ReLU).

A mathematical formulation for determining a linear combination of binary activations to approximate a real-valued activation function in accordance with example embodiments follows. In particular, the linear combination of binary activations may be given by the following: $R \approx A = \beta_1 A_1 + \beta_2 A_2 + \ldots + \beta_N A_N$, where R is a real-valued activation function, and $A_i$ is a binary activation. In example embodiments, each binary activation may be given by $A_i = H_{vi}(R)$. Further, in example embodiments, the binarization function may be given by $H_{vi}(R) = 2I_{h_v(R)>0.5} - 1$, where I is an indicator function. In example embodiments, if $h_v(R)>0.5$ is true, then $I_{h_v(R)>0.5}=1$, and $H_v(R)=+1$. Alternatively, if $h_v(R)>0.5$ is false, then $I_{h_v(R)>0.5}=0$, and $H_v(R)=-1$. In example embodiments, $h_v(x)=\text{clip}(x+v, 0,1)$, where v is the shift parameter. Thus, in example embodiments, the forward path for binary activation is given by $A=\Sigma_{n=1}^{N}\beta_n H_{v_n}(R)$.

At block 506 of the method 500, in example embodiments, the input 102 is processed using each binary activation (e.g., $H_{v1}$, $H_{v2}$, and $H_{v3}$) to obtain a respective binary activation result corresponding to each binary activation. Each binary activation result taken together constitutes a set of binary activation results obtained by processing the input 102 using the linear combination of binary activations. The set of binary activation results may be provided as binary activation approximation data 406 to one or more convolution modules 412, whose operation will be described in more detail later in this disclosure.

Referring again to FIG. 5, at block 508 of the method 500, in accordance with example embodiments, a determination is made as to whether the filter of the convolutional layer is a 1×1 filter. In response to a positive determination at block 508, the method 500 proceeds to block 510, where, in example embodiments, computer-executable instructions of one or more binary weight approximation module(s) 408 are executed to approximate the 1×1 filter using a linear combination of binary filters for each path of the input 102. In example embodiments, the number of paths of an input (i.e., the number of binary activations in the linear combination of binary activations used to approximate the real-valued activation function) may be determined through experimentation. As used herein, the term weight refers to a value contained in a filter.

FIG. 1 depicts an example representation of a linear combination of binary filters 112 that approximates a 1×1 filter. As depicted in FIG. 1, respective binary filters 116, 118, 120 (e.g., $B_1$, $B_2$, $B_3$) are each applied to an input 114 (e.g., the original 1×1 filter) and the results are multiplied by values $\alpha_1$, $\alpha_2$, $\alpha_3$, respectively, and summed 122 to produce an output 124. Thus, the output 124 represents the linear combination $\alpha_1 B_1 + \alpha_2 B_2 + \alpha_3 B_3$ applied to the input 114. It should be appreciated that the linear combination 112 may be used to approximate the 1×1 filter for each path of the input 102. Stated another way, if the filter of the convolutional layer is a 1×1 filter, the linear combination of binary filters that approximates the 1×1 filter may be used with respect to each binary activation.

A mathematical formulation for determining the linear combination of binary filters used for each path of the input 102 in accordance with example embodiments follows. In particular, in accordance with example embodiments, a linear combination of binary filters used to approximate a 1×1 filter for each path of the input 102 is given as follows: $W_i \approx \alpha_{i1} B_{i1} + \alpha_{i2} B_{i2} + \ldots + \alpha_{iM} B_{iM}$, where $W_i \in R^{w \times h \times c}$, $B_{i(1 \ldots M)} \in \{+1, -1\}^{w \times h \times c}$, w is the width of the original 1×1 filter, h is the height of the original 1×1 filter, and c is the number of channels of the input 102. The values of each $\alpha$ and each B for each path of the input 102 (given by $\alpha^*$ and $B^*$) can then be determined by solving the following optimization problem: $\alpha^*, B^* = \mathrm{argmin}\, |w - B\alpha|_2^2$, where B=[vec($B_1$), vec($B_2$), ..., vec($B_M$)], w=vec(W), and $\alpha = [\alpha_1, \alpha_2, \ldots, \alpha_M]^T$. In example embodiments, the upper value "2" indicates a square of the quantity $\sqrt[3]{w - \beta\alpha}$, while the lower value "2" indicates that an L2 norm is being determined. In example embodiments, W represents the original high precision weight that is being approximated.

In example embodiments, a binary filter $B_i$, may first be calculated and then this calculated value for $B_i$, may be used to determine $\alpha^*$. For instance, in example embodiments, $B_i$, may be defined as follows: $B_i = \mathrm{sign}(\overline{W} + u_i \mathrm{std}(W))$, where $\overline{W} = W - \mathrm{mean}(W)$, and $$u_i = -1 + (i-1)\frac{2}{M-1},$$

where M represents the number of binary filters used in a linear combination. The quantity $\alpha^*$ can then be obtained by solving the optimization problem $\alpha^* = \mathrm{argmin}\, |w - B\alpha|_2^2$ as noted above.

Referring again to FIG. 5, if a negative determination is made at block 508—indicating that the filter of the convolutional layer is a k×k filter (k>1)—the method 500 proceeds to block 512, where, in example embodiments, computer-executable instructions of the binary weight approximation module(s) 408 are executed to approximate the k×k filter using a scaled binary filter. Each k×k filter may have any suitable size as long as k>1 including, without limitation, 3×3 filters, 5×5 filters, and so forth.

FIG. 1 depicts an example representation of a scaled binary filter 104 that approximates a k×k filter. A binary filter 108 is applied to an input 106 (e.g., the original k×k filter). The result of application of the binary filter 108 to the input 106 is scaled by a scalar value a to produce an output 110. It should be appreciated that the scaled binary filter 104 approximates the k×k filter for each path of the input 102.

A mathematical formulation for determining the scaled binary filter used to approximate the k×k filter for each path of the input 102 in accordance with example embodiments follows. In particular, in accordance with example embodiments, a scaled binary filter used to approximate a k×k filter for each path of the input 102 is given as follows: $W_i = \alpha_i B_i$, where $B_1 \in \{+1, -1\}^{w \times h \times c}$, w is the width of the original k×k filter, h is the height of the original k×k filter, and c is the number of channels of the input 102. The values for a and B for a given high precision weight W (given by $\alpha^*$ and $B^*$) can then be determined by solving the following optimization problem: $\alpha^*, B^* = \mathrm{argmin}\, |W - \alpha B|_2^2$. The upper value "2" indicates a square of the quantity $|W - \alpha B|$, while the lower value "2" indicates that an L2 norm is being determined. In example embodiments, W represents the original high precision weight that is being approximated. The quantities a and B may be represented in vector form prior to solving the above-described optimization problem. In example embodiments, the scaled binary filter used to approximate a k×k filter can be viewed as a special case of the linear combination approximation where only one binary filter is used.

In example embodiments, the scaled binary filter generated at block 512 of the method 500, or alternatively, the linear combination of binary filters generated at block 510 of the method 500 may be provided as binary weight approximation data 410 to the one or more convolution modules 412. At block 514 of the method 500, in accordance with example embodiments, computer-executable instructions of the convolution module(s) 412 are executed to convolve each binary activation result obtained at block 506 of the method 500 with the approximation of the 1×1 filter generated at block 510 or the approximation of the k×k filter generated at block 512 to a obtain a set of convolved results.

More specifically, referring to FIG. 1, in example embodiments, each binary activation result that is obtained by processing the input 102 using a corresponding binary activation (e.g., $H_{v1}$, $H_{v2}$, $H_{v3}$) is convolved with the approximation of the 1×1 filter or the approximation of the k×k filter (whichever the case may be) to obtain a convolved result corresponding to each binary activation result. In example embodiments, computer-executable instructions of the convolution module(s) 412 are executed to scale and sum the convolved results at block 516 of the method 500 to obtain an output 414. This is illustratively depicted in FIG. 1 where the three binary activations $H_{v1}$, $H_{v2}$, and $H_{v3}$ are respectively convolved with the appropriate approximated weights and then multiplied by scalar quantities $\beta_1$, $\beta_2$, and $\beta_3$, respectively, and summed 126 to produce an output 128.

In example embodiments, a mathematical formulation of the operations at blocks 514 and 516 may be given as follows. If A and O represent the input and output tensors, respectively, then the operations performed at blocks 514 and 516 of the method 500 may be given by $O = \sum_{m=1}^{M} \alpha_m \text{Conv}(B_m, A)$, where the whole convolution is given by the following approximation: $\text{Conv}(W, R) \approx \sum_{m=1}^{M} \alpha_m \text{Conv}(B_m, A) = \text{Conv} \sum_{m=1}^{M} \alpha_m, \sum_{n=1}^{N} \beta_n A_n = \sum_{m=1}^{M} \sum_{n=1}^{N} \alpha_m, \beta_n \text{Conv}(B_m, A_n)$. Thus, $\text{Conv}(B_m, A_n)$ represents binary convolution that is performed efficiently at runtime.

At block 518 of the method 500, in example embodiments, computer-executable instructions of one or more backpropagation modules 418 are executed to perform backpropagation to determine updated weights/activations 420. More specifically, the output 414 of a given convolutional layer of the high precision low bit CNN 400 may be provided as input to a next convolutional layer of the CNN 400, where the illustrative method 500 may again be performed. This may continue through each convolutional layer of the CNN 400 until a final output 416 of a last convolutional layer is obtained. A cost function (e.g., gradient) may then be determined with respect to the final output 416 and computer-executable instructions of the backpropagation module(s) 418 may be executed to backpropagate the gradient through each convolutional layer of the CNN 400 to determine updated weights/activations 420.

In example embodiments, the backward propagation path for the approximated weights (e.g., the scaled binary filter(s) used to approximate k×k filter(s) and/or the linear combination(s) of binary filters used to approximate 1×1 filter(s)) is given by the following mathematical formulation:

$$\frac{\partial c}{\partial W} = \frac{\partial c}{\partial O}\left(\sum_{m=1}^{M} \alpha_m \frac{\partial O}{\partial B_m} \frac{\partial B_m}{\partial W}\right) = \frac{\partial c}{\partial O}\left(\sum_{m=1}^{M} \alpha_m \frac{\partial O}{\partial B_m}\right) = \sum_{m=1}^{M} \alpha_m \frac{\partial c}{\partial B_m},$$

where O represents the output tensor and W represents the original high precision weight. Further, in example embodiments, the backpropagation path for binary activations is given by the following mathematical formulation:

$$\frac{\partial c}{\partial R} = \frac{\partial c}{\partial A} \frac{\partial A}{\partial R} = \frac{\partial c}{\partial A} \sum_{n=1}^{N} \beta_n I_{0 \leq R - v_n \leq 1}.$$

In example embodiments, high precision parameters are used in the learning phase of the high precision low bit CNN 400. In particular, in example embodiments, a CNN is first trained to obtain high precision weights, which are then used to initialize the high precision low bit CNN 400. The high precision low bit CNN 400 is then fine-tuned during a training phase to obtain the low bit approximated filters (weights) and approximated activations. Once the training phase is completed, the trained CNN 400 can be used to perform classification during a testing phase. In the testing phase, all weights and other parameters have been learned (i.e., are fixed), and input to the trained CNN 400 is passed layer by layer through the CNN 400 until a result is obtained at the last layer.

Figure 2:
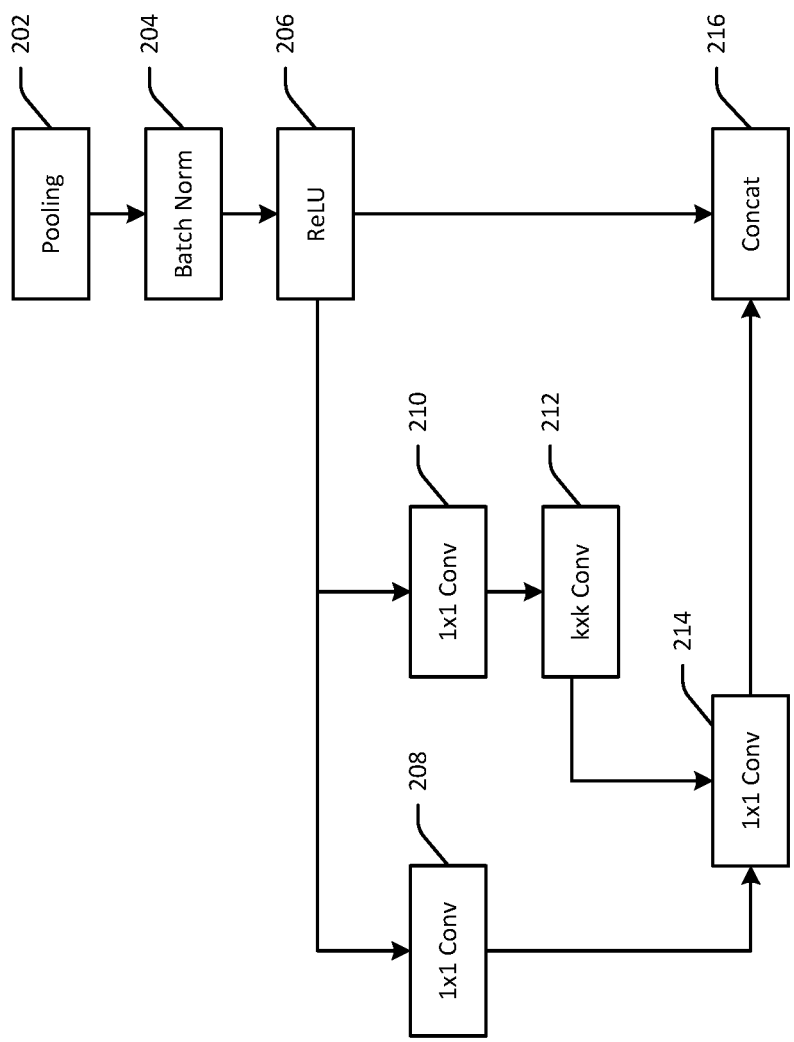
FIG. 2 schematically depicts a portion of a CNN in accordance with one or more example embodiments of the disclosure.

FIG. 2 schematically depicts a portion of a CNN in accordance with one or more example embodiments of the disclosure. The portion of a CNN depicted in FIG. 2 includes a pooling layer 202, followed by a batch normalization layer 204, followed by a convolutional layer 218. The pooling layer 202 may provide dimensionality reduction of an output of a lower layer of the CNN. The pooling layer 202 may provide the dimensionality reduction in any suitable way such as, for example, by selecting the maximum value or average value of each grouping of weights of one or more activation maps outputted from a lower convolutional layer. The convolutional layer 218 of the portion of a CNN depicted in FIG. 2 includes various convolutions performed using 1×1 filters and a k×k filter (k>1). In particular, in the example embodiment depicted in FIG. 2, the depicted convolutional layer 218 of the CNN includes a convolution 208 using a 1×1 filter, a convolution 210 using a 1×1 filter, a convolution 212 using a k×k filter, and a convolution 214 using a 1×1 filter. More specifically, a result of the convolution 210 is provided as input to the convolution 212, and a result of convolution 212 is provided as input to the convolution 214. Also provided as input to the convolution 214 is the result of the convolution 208. The result of the convolution 214 is then concatenated with the result of an activation function 206 (illustratively depicted as a ReLU) to obtain an output of the convolutional layer 218.

Figure 3:
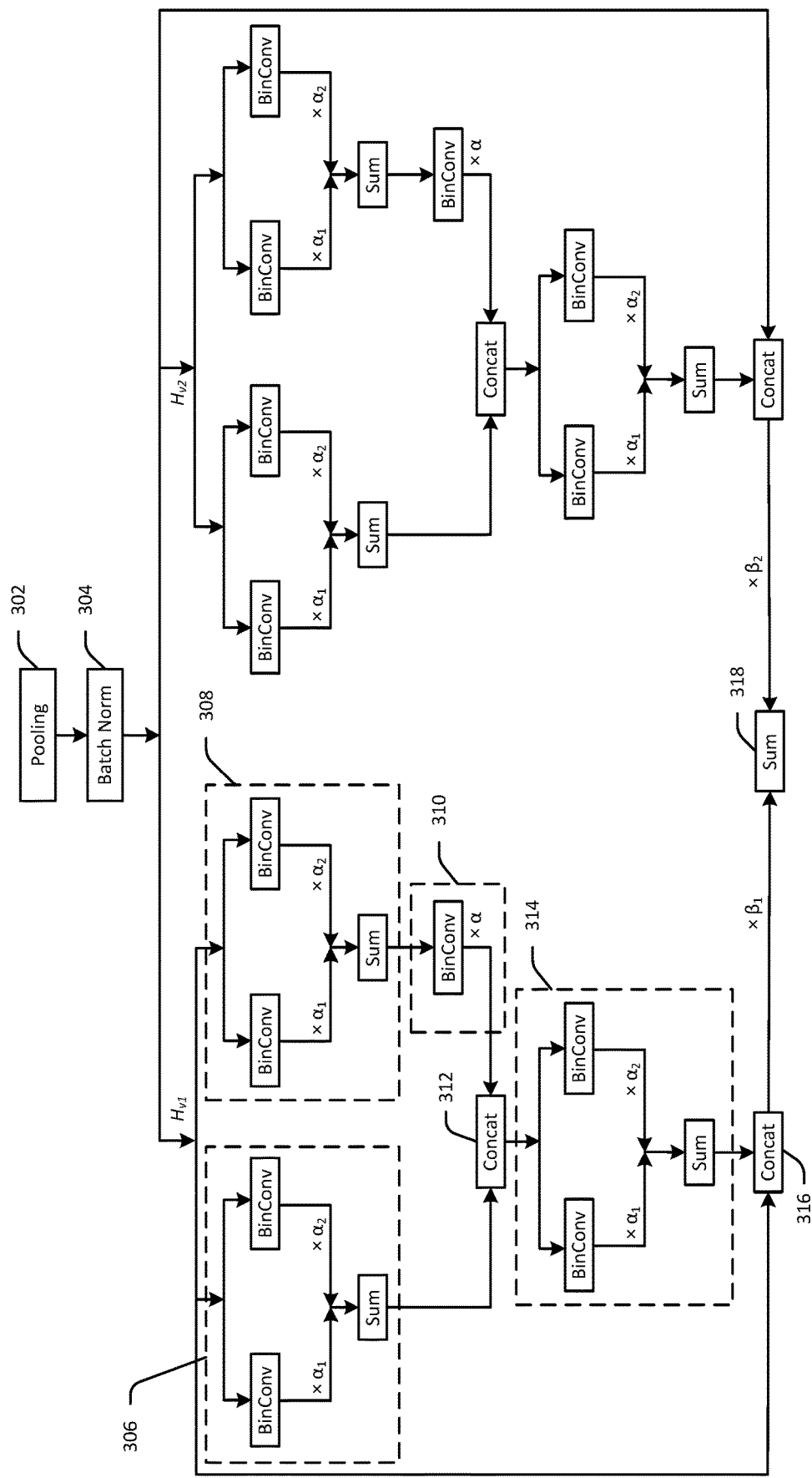
FIG. 3 schematically depicts the portion of the CNN depicted in FIG. 2 implemented in a high precision low bit CNN in accordance with one or more example embodiments, with 1×1 filters approximated using linear combinations of binary filters, a k×k filter approximated using a scaled binary filter, and a real-valued activation function approximated using a linear combination of binary activations.

FIG. 3 schematically depicts the portion of the CNN depicted in FIG. 2 implemented in a high precision low bit CNN (e.g., the CNN 400) in accordance with one or more example embodiments. The pooling layer 202 and the batch normalization layer 204 are represented by the pooling layer 302 and the batch normalization layer 304, respectively. The real-valued activation function 206 is illustratively approximated by binary activations $H_{v1}$ and $H_{v2}$ corresponding to paths 320 and 322, respectively. It should be appreciated that two binary activations are shown solely by way of example and that any number of binary activations may be used to approximate the activation function 206.

In example embodiments, the 1×1 convolution 208 is approximated by a linear combination of binary filters 306 in which binary filters 306A, 306B are multiplied by respective scalar quantities and summed 306C to produce a result. Similarly, the 1×1 convolution 210 is approximated by a linear combination of binary filters 308 in which binary filters 308A, 308B are multiplied by respective scalar quantities and summed 308C to produce a result. The result of the approximated convolution 308 is provided as input to a scaled binary filter 310 that approximates the k×k convolution 212. The scaled binary filter 310 multiples a binary filter 310A by a scalar quantity to produce a result. The result of approximated convolution 306 is then concatenated 312 with the result of the scaled binary filter 310, and the result is provided as input to another linear combination of binary filters 314 that approximates the 1×1 convolution 214 and in which binary filters 314A, 314B are multiplied by respective scalar quantities and summed 314C to produce a result. The result of the approximated convolution 314 is then concatenated 316 (e.g., convolved) with the result of the binary activation $H_{v1}$.

In example embodiments, an equivalent process is performed with respect to the binary activation $H_{v2}$ (the path 322 of the binary activation $H_{v2}$). More specifically, in example embodiments, a linear combination of binary filters 324 is provided that is equivalent to the linear combination of binary filters 306 and produces that same result. In addition, in example embodiments, a linear combination of binary filters 326 is provided that is equivalent to the linear combination of binary filters 308 and produces the same result. The result of the linear combination of binary filters 326 is provided as input to a scaled binary filter 328 that, in example embodiments, is equivalent to the scaled binary filter 310 and produces the same result. The result of the scaled binary filter 328 and the result of the linear combination of binary filters 324 are concatenated 330 (e.g., convolved) and the result is provided as input to a linear combination of binary filters 332. In example embodiments, the linear combination of binary filters 332 is equivalent to the linear combination of binary filters 314 and produces the same result. The result of the approximated convolution 332 is then concatenated 334 (e.g., convolved) with the result of the binary activation $H_{v2}$. The results of convolving the binary activation results of $H_{v1}$ and $H_{v2}$ with the corresponding approximated convolutions are then multiplied by scalar quantities $\beta_1$ and $\beta_2$, respectively, and summed 318. The resulting sum 318 may then be provided as input to a next convolutional layer.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Figure 6:
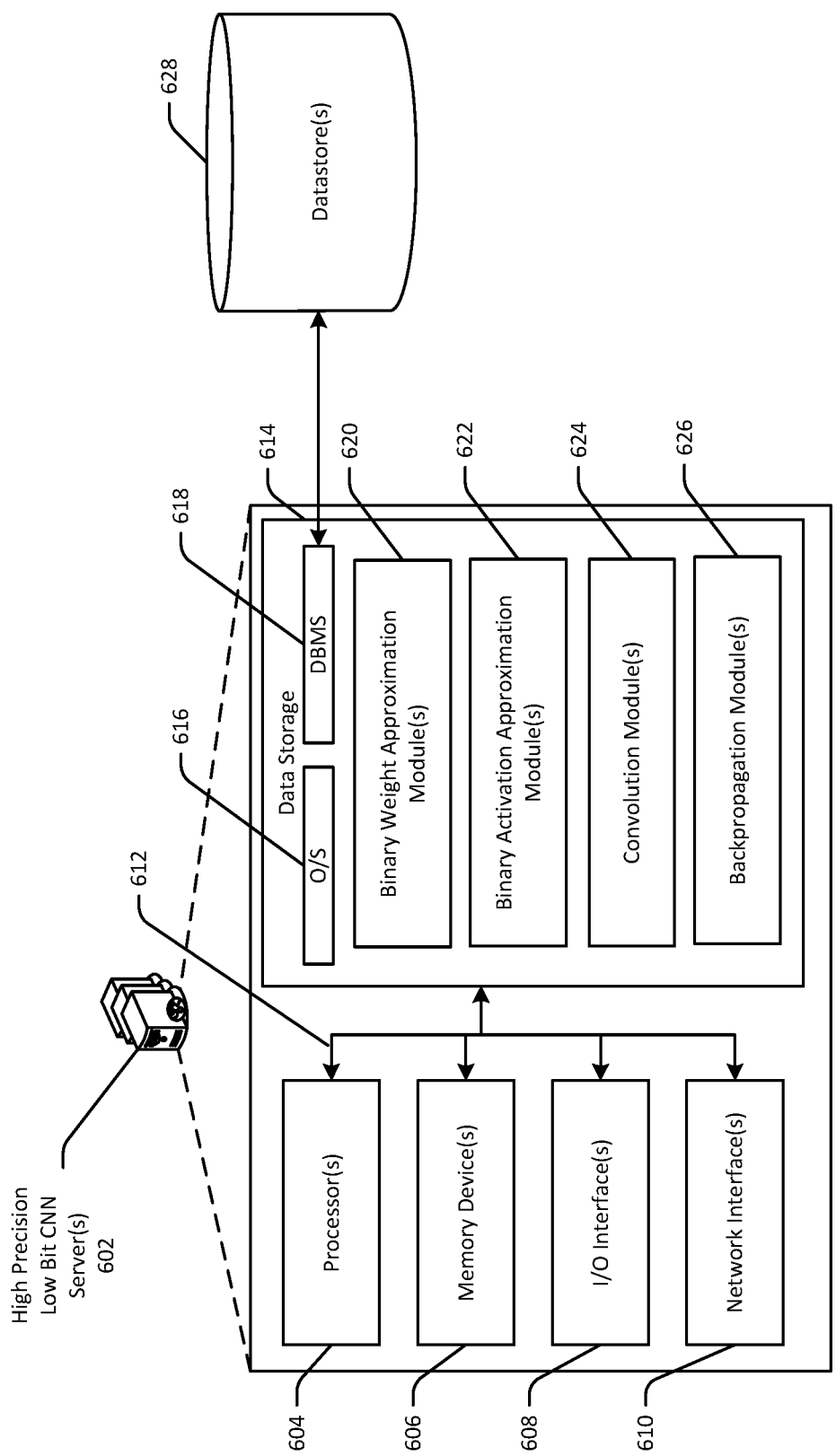
FIG. 6 is a schematic diagram of an illustrative computing device configured to implement one or more example embodiments of the disclosure.

FIG. 6 is a schematic diagram of an illustrative configuration of one or more high precision low bit CNN servers 602 configured to implement a high precision low bit CNN (e.g., the CNN 400) in accordance with one or more example embodiments of the disclosure. While the high precision low bit CNN server 602 may be described herein in the singular, it should be appreciated that multiple instances of the high precision low bit CNN server 602 may be provided, and functionality described in connection with the high precision low bit CNN server 602 may be distributed across such multiple instances.

In an illustrative configuration, the high precision low bit CNN server 602 may include one or more processors (processor(s)) 604, one or more memory devices 610 (generically referred to herein as memory 606), one or more input/output ("I/O") interface(s) 608, one or more network interfaces 610, and data storage 614. The high precision low bit CNN server 602 may further include one or more buses 612 that functionally couple various components of the high precision low bit CNN server 602.

The bus(es) 612 may include at least one of a system bus, a memory bus, an address bus, or a message bus, and may permit the exchange of information (e.g., data (including computer-executable code), signaling, etc.) between various components of the high precision low bit CNN server 602. The bus(es) 612 may include, without limitation, a memory bus or a memory controller, a peripheral bus, an accelerated graphics port, and so forth. The bus(es) 612 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 606 of the high precision low bit CNN server 602 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 606 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 606 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 614 may include removable storage and/or non-removable storage including, but not limited to, magnetic storage, optical disk storage, and/or tape storage. The data storage 614 may provide non-volatile storage of computer-executable instructions and other data. The memory 606 and the data storage 614, removable and/or non-removable, are examples of computer-readable storage media (CRSM) as that term is used herein.

The data storage 614 may store computer-executable code, instructions, or the like that may be loadable into the memory 606 and executable by the processor(s) 604 to cause the processor(s) 604 to perform or initiate various operations. The data storage 614 may additionally store data that may be copied to memory 606 for use by the processor(s) 604 during the execution of the computer-executable instructions. Moreover, output data generated as a result of execution of the computer-executable instructions by the processor(s) 604 may be stored initially in memory 606, and may ultimately be copied to data storage 614 for non-volatile storage.

More specifically, the data storage 614 may store one or more operating systems (O/S) 616; one or more database management systems (DBMS) 618 configured to access the memory 606 and/or one or more datastores 628; and one or more program modules, applications, engines, computer-executable code, scripts, or the like such as, for example, one or more binary weight approximation modules 620, one or more binary activation approximation modules 622, one or more convolution modules 624, and one or more backpropagation modules 626. Any of the components depicted as being stored in data storage 614 may include any combination of software, firmware, and/or hardware. The software and/or firmware may include computer-executable code, instructions, or the like that may be loaded into the memory 606 for execution by one or more of the processor(s) 604 to perform any of the operations described earlier in connection with correspondingly named engines or modules depicted, for example, in FIG. 4.

Although not depicted in FIG. 4, the data storage 614 may further store various types of data utilized by components of the high precision low bit CNN server 602 (e.g., any of the data depicted as being stored in the datastore(s) 628). Any data stored in the data storage 614 may be loaded into the memory 606 for use by the processor(s) 604 in executing computer-executable code. In addition, any data stored in the data storage 614 may potentially be stored in the datastore(s) 628 and may be accessed via the DBMS 618 and loaded in the memory 606 for use by the processor(s) 604 in executing computer-executable instructions, code, or the like.

The processor(s) 604 may be configured to access the memory 606 and execute computer-executable instructions loaded therein. For example, the processor(s) 604 may be configured to execute computer-executable instructions of the various program modules, applications, engines, or the like of the high precision low bit CNN server 602 to cause or facilitate various operations to be performed in accordance with one or more embodiments of the disclosure. The processor(s) 604 may include any suitable processing unit capable of accepting data as input, processing the input data in accordance with stored computer-executable instructions, and generating output data. The processor(s) 604 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 604 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 604 may be capable of supporting any of a variety of instruction sets.

Referring now to other illustrative components depicted as being stored in the data storage 614, the O/S 616 may be loaded from the data storage 614 into the memory 606 and may provide an interface between other application software executing on the high precision low bit CNN server 602 and hardware resources of the high precision low bit CNN server 602. More specifically, the O/S 616 may include a set of computer-executable instructions for managing hardware resources of the high precision low bit CNN server 602 and for providing common services to other application programs (e.g., managing memory allocation among various application programs). In certain example embodiments, the O/S 616 may control execution of one or more of the program modules depicted as being stored in the data storage 614. The O/S 616 may include any operating system now known or which may be developed in the future including, but not limited to, any server operating system, any mainframe operating system, or any other proprietary or non-proprietary operating system.

The DBMS 618 may be loaded into the memory 606 and may support functionality for accessing, retrieving, storing, and/or manipulating data stored in the memory 606, data stored in the data storage 614, and/or data stored in the datastore(s) 630. The DBMS 618 may use any of a variety of database models (e.g., relational model, object model, etc.) and may support any of a variety of query languages. The DBMS 618 may access data represented in one or more data schemas and stored in any suitable data repository.

The datastore(s) 628 may include, but are not limited to, databases (e.g., relational, object-oriented, etc.), file systems, flat files, distributed datastores in which data is stored on more than one node of a computer network, peer-to-peer network datastores, or the like. The datastore(s) 628 may store various types of data including, without limitation, the types of data depicted in FIG. 4 such as binary weight approximation data 410, binary activation approximation data 406, intermediate data (e.g., convolved and summed output 414), and so forth. It should be appreciated that in certain example embodiments, any of the datastore(s) 628 and/or any of the data depicted as residing thereon may additionally, or alternatively, be stored locally in the data storage 614.

Referring now to other illustrative components of the high precision low bit CNN server 602, the input/output (I/O) interface(s) 608 may facilitate the receipt of input information by the high precision low bit CNN server 602 from one or more I/O devices as well as the output of information from the high precision low bit CNN server 602 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the high precision low bit CNN server 602 or may be separate. The I/O devices may further include, for example, any number of peripheral devices such as data storage devices, printing devices, and so forth.

The I/O interface(s) 608 may also include an interface for an external peripheral device connection such as universal serial bus (USB), FireWire, Thunderbolt, Ethernet port or other connection protocol that may connect to one or more networks. The I/O interface(s) 608 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The high precision low bit CNN server 602 may further include one or more network interfaces 610 via which the high precision low bit CNN server 602 may communicate with any of a variety of other systems, platforms, networks, devices, and so forth. The network interface(s) 610 may enable communication, for example, with one or more other devices via one or more network(s) which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the engines/modules depicted in FIG. 6 as being stored in the data storage 614 (or depicted in FIG. 4) are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the high precision low bit CNN server 602 and/or hosted on other computing device(s) accessible via one or more of networks, may be provided to support functionality provided by the engines/modules depicted in FIGS. 4 and 6 and/or additional or alternate functionality. Further, functionality may be modularized differently such that processing described as being supported collectively by the collection of engines/modules depicted in FIGS. 4 and 6 may be performed by a fewer or greater number of engines or program modules, or functionality described as being supported by any particular engine or module may be supported, at least in part, by another engine or program module. In addition, engines or program modules that support the functionality described herein may form part of one or more applications executable across any number of devices of the high precision low bit CNN server 602 in accordance with any suitable computing model such as, for example, a client-server model, a peer-to-peer model, and so forth. In addition, any of the functionality described as being supported by any of the engines/modules depicted in FIGS. 4 and 6 may be implemented, at least partially, in hardware and/or firmware across any number of devices.

It should further be appreciated that the high precision low bit CNN server 602 may include alternate and/or additional hardware, software, or firmware components beyond those described or depicted without departing from the scope of the disclosure. More particularly, it should be appreciated that software, firmware, or hardware components depicted as forming part of the high precision low bit CNN server 602 are merely illustrative and that some components may not be present or additional components may be provided in various embodiments. While various illustrative engines/modules have been depicted and described as software engines or program modules stored in data storage 614, it should be appreciated that functionality described as being supported by the engines or modules may be enabled by any combination of hardware, software, and/or firmware. It should further be appreciated that each of the above-mentioned engines or modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine or module may, in various embodiments, be provided at least in part by one or more other engines or modules. Further, one or more depicted engines or modules may not be present in certain embodiments, while in other embodiments, additional engines or modules not depicted may be present and may support at least a portion of the described functionality and/or additional functionality. Moreover, while certain engines modules may be depicted or described as sub-engines or sub-modules of another engine or module, in certain embodiments, such engines or modules may be provided as independent engines or modules or as sub-engines or sub-modules of other engines or modules.

One or more operations of the method 500, FIG. 5, may be performed by one or more high precision low bit CNN servers 602 having the illustrative configuration depicted in FIG. 6, or more specifically, by one or more engines, program modules, applications, or the like executable on such server(s) 602. It should be appreciated, however, that such operations may be implemented in connection with numerous other system configurations.

The operations described and depicted in the illustrative method of FIG. 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for training a high precision low bit convolutional neural network (CNN), the method comprising:
   receiving input to a convolutional layer of the CNN, the convolutional layer including a 1×1 filter;
   approximating a real-valued activation function using a linear combination of binary activations;
   processing the input using each binary activation to obtain a set of binary activation results;
   approximating the 1×1 filter using a respective linear combination of binary filters;
   convolving each binary activation result with the respective linear combination of binary filters to obtain a set of convolved results; and
   summing the convolved results to obtain an output of the convolutional layer.

2. The computer-implemented method of claim 1, wherein approximating the 1×1 filter of the convolutional layer comprises:
   solving an optimization problem to determine a set of scalar values and a set of corresponding binary filters of the linear combination of binary filters.

3. The computer-implemented method of claim 1, wherein the input is a first input, the convolutional layer is a first convolutional layer, the set of binary activation results is a first set of binary activation results, and the set of convolved results is a first set of convolved results, the method further comprising:
   receiving second input to a second convolutional layer of the CNN, the second convolutional layer including a non-1×1 filter;
   processing the second input using each binary activation to obtain a second set of binary activation results;
   approximating the non-1×1 filter using a scaled binary filter;
   convolving each binary activation result in the second set of binary activation results with the scaled binary filter to obtain a second set of convolved results; and summing the convolved results in the second set of convolved results to obtain an output of the second convolutional layer.

4. The computer-implemented method of claim 3, wherein approximating the non-1×1 filter of the second convolutional layer comprises:
solving an optimization problem to determine a scalar value and a binary filter of the scaled binary filter.

5. The computer-implemented method of claim 3, further comprising:
performing backpropagation to adjust respective weights of the scaled binary filter and weights of the linear combination of binary filters; and
performing backpropagation to adjust one or more binary activations of the linear combination of binary activations.

6. The computer-implemented method of claim 1, wherein approximating the real-valued activation function using the linear combination of binary activations comprises:
applying a binarization function to the real-valued activation function using, at least in part, an indicator function that produces a binary output.

7. The computer-implemented method of claim 1, wherein the input comprises an image of a surrounding environment of a vehicle and the trained high precision low bit CNN is implemented on an embedded device operatively coupled to the vehicle, the method further comprising:
applying the trained high precision low bit CNN to the image to perform object recognition; and
presenting a notification of the results of the object recognition on a display operatively coupled to the vehicle.

8. A system for training a high precision low bit convolutional neural network (CNN), the system comprising:
at least one memory storing computer-executable instructions; and
at least one processor configured to access the at least one memory and execute the computer-executable instructions to:
receive input to a convolutional layer of the CNN, the convolutional layer including a 1×1 filter;
approximate a real-valued activation function using a linear combination of binary activations;
process the input using each binary activation to obtain a set of binary activation results;
approximate the 1×1 filter using a linear combination of binary filters;
convolving each binary activation result with the respective linear combination of binary filters to obtain a set of convolved results; and
summing the convolved results to obtain an output of the convolutional layer.

9. The system of claim 8, wherein the at least one processor is configured to approximate the 1×1 filter of the convolutional layer executing the computer-executable instructions to:
solve an optimization problem to determine a set of scalar values and a set of corresponding binary filters of the linear combination of binary filters.

10. The system of claim 8, wherein the input is a first input, the convolutional layer is a first convolutional layer, the set of binary activation results is a first set of binary activation results, and the set of convolved results is a first set of convolved results, and wherein the at least one processor is further configured to execute the computer-executable instructions to:
receive second input to a second convolutional layer of the CNN, the second convolutional layer including a non-1×1 filter;
process the second input using each binary activation to obtain a second set of binary activation results;
approximate the non-1×1 filter using a scaled binary filter;
convolve each binary activation result in the second set of binary activation results with the scaled binary filter to obtain a second set of convolved results; and
sum the convolved results in the second set of convolved results to obtain an output of the second convolutional layer.

11. The system of claim 10, wherein the at least one processor is configured to approximate the non-1×1 filter of the second convolutional layer by executing the computer-executable instructions to:
solve an optimization problem to determine a scalar value and a binary filter of the scaled binary filter.

12. The system of claim 10, wherein the at least one processor is further configured to execute the computer-executable instructions to:
perform backpropagation to adjust respective weights of each respective scaled binary filter and respective weights of each respective linear combination of binary filters; and perform backpropagation to adjust one or more binary activations of the linear combination of binary activations.

13. The system of claim 8, wherein the at least one processor is configured to approximate the real-valued activation function using the linear combination of binary activations by executing the computer-executable instructions to:
apply a binarization function to the real-valued activation function using, at least in part, an indicator function that produces a binary output.

14. The system of claim 8, wherein the input comprises an image of a surrounding environment of a vehicle and the trained high precision low bit CNN is implemented on an embedded device operatively coupled to the vehicle, and wherein the at least one processor is further configured to execute the computer-executable instructions to:
apply the trained high precision low bit CNN to the image to perform object recognition; and
present a notification of the results of the object recognition on a display operatively coupled to the vehicle.

15. A computer program product for training a high precision low bit convolutional neural network (CNN), the computer program product comprising a non-transitory storage medium readable by a processing circuit, the storage medium storing instructions executable by the processing circuit to cause a method to be performed, the method comprising:
receiving input to a convolutional layer of the CNN, the convolutional layer including a 1×1 filter;
approximating a real-valued activation function using a linear combination of binary activations;
processing the input using each binary activation to obtain a set of binary activation results;
approximating the 1×1 filter using a linear combination of binary filters;
convolving each binary activation result with the respective linear combination of binary filters to obtain a set of convolved results; and
summing the convolved results to obtain an output of the convolutional layer.

16. The computer program product of claim 15, wherein approximating the 1×1 filter of the convolutional layer comprises:
   solving an optimization problem to determine a set of scalar values and a set of corresponding binary filters of the linear combination of binary filters.

17. The computer program product of claim 15, wherein the input is a first input, the convolutional layer is a first convolutional layer, the set of binary activation results is a first set of binary activation results, and the set of convolved results is a first set of convolved results, the method further comprising:
   receiving second input to a second convolutional layer of the CNN, the second convolutional layer including a non-1×1 filter;
   processing the second input using each binary activation to obtain a second set of binary activation results;
   approximating the non-1×1 filter using a scaled binary filter;
   convolving each binary activation result in the second set of binary activation results with the scaled binary filter to obtain a second set of convolved results; and
   summing the convolved results in the second set of convolved results to obtain an output of the second convolutional layer.

18. The computer program product of claim 17, wherein approximating the non-1×1 filter of the second convolutional layer comprises:
   solving an optimization problem to determine a scalar value and a binary filter of the scaled binary filter.

19. The computer program product of claim 17, the method further comprising:
   performing backpropagation to adjust respective weights of each respective scaled binary filter and respective weights of each respective linear combination of binary filters; and
   performing backpropagation to adjust one or more binary activations of the linear combination of binary activations.

20. The computer program product of claim 15, wherein the input comprises an image of a surrounding environment of a vehicle and the trained high precision low bit CNN is implemented on an embedded device operatively coupled to the vehicle, the method further comprising:
   applying the trained high precision low bit CNN to the image to perform object recognition; and
   presenting a notification of the results of the object recognition on a display operatively coupled to the vehicle.

* * * * *